United States Patent
Taivalsaari (10) Patent No.: US 6,557,023 B1
(45) Date of Patent: Apr. 29, 2003

(54) METHOD AND APPARATUS FOR AVOIDING ARRAY CLASS CREATION IN VIRTUAL MACHINES

(75) Inventor: Antero Taivalsaari, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/322,210

(22) Filed: May 28, 1999

(51) Int. Cl.⁷ .................................................. G06F 9/44
(52) U.S. Cl. .......................... 709/1; 709/316; 717/116; 717/118
(58) Field of Search ................................. 709/310–320

(56) References Cited

U.S. PATENT DOCUMENTS

| | | | |
|---|---|---|---|
| 5,875,335 A | | 2/1999 | Beard |
| 5,896,532 A | * | 4/1999 | Blewett ...................... 709/310 |
| 6,003,038 A | * | 12/1999 | Chen .......................... 707/103 |
| 6,018,628 A | * | 1/2000 | Stoutamire .................. 717/147 |
| 6,374,286 B1 | * | 3/2002 | Gee et al. .................... 709/108 |

OTHER PUBLICATIONS

Eckel, Bruce, Black Belt C++: The Masters Collection, M&T Books, pp(5), 1994.*
Samek, Miro, "Portable Inheritance and Polymorphism in C", Embedded Systems Programming, pp(11), Dec., 1997.*
Ladd, Scott R., "Basic Arrays", C++ Components and Algorithms, M&T Books, pp(18), 1994.*
DiLascia, Paul, "C/C++ Q & A", Microsoft Systems Journal, pp(13), Jun. 1994.*
J. Van Katwijk, Addressing Types and Objects in Ada, Software Practice & Experience, May 1987, pp. 319–343, vol. 17, No. 5, John Wiley & Sons Ltd., Chichester, Sussex, Great Britain.
Gosling et al., The Java Language Specification, Chapter 12, Addison-Wesley 1996.
Lindholm et al., The Java Virtual Machine Specification, section 2.16.2, p. 43 and section 5.1.3, p. 146–147.
Lieberman, H., Using Prototypical Objects to Implement Shared Behavior in Object Oriented Systems, OOPSLA 86 Proceedings, Sep. 1986, pp. 214–223.
Gosling et al., Java–Simple and Familiar, The Java Language Environment, May 1996, Section 2.1.4, p. 22, Sun Microsystems, Inc.
Gosling et al., Arrays, The Java Language Environment, May 1996, Section 2.1.3, p. 21, Sun Microsystems, Inc.
Gosling et al., The Package java.lang, The Java Language Specification, First Edition, 1996, pp. 455–469, Sun Microsystems, Inc.
Gosling et al., Types, Values, and Variables, The Java Language Specification, First Edition, 1996, pp. 40–49, Sun Microsystems, Inc.

* cited by examiner

*Primary Examiner*—St. John Courtenay, III
(74) *Attorney, Agent, or Firm*—Gunnison, McKay & Hodgson, L.L.P.; Philip J. McKay (57) ABSTRACT

Embodiments of the invention comprise a method and apparatus for avoiding array class creation in, for example, virtual machines for object-oriented programming languages. Embodiments of the invention reduce the internal structures created for arrays at runtime, thereby reducing memory consumption. Unlike in a traditional implementation, where a separate array class is created for each array of different type, in an embodiment of the invention the type information is stored in array instances instead. Array classes are not created at all. Rather, the root class of the class hierarchy (e.g., "java.lang.Object") is used as the class of each array instance. When an array instance is instantiated, a reference to the "java.lang.Object" class is created in the class field of the array instance and the type information is stored in the instance itself. In one embodiment of the invention, an integer type value is stored in a special type field of the array instance. The type field can be part of an existing field or a new field of the array instance. In an alternate embodiment of the invention, a type field is included in an array instance that can contain a reference, or pointer, to the element type class for the array.

13 Claims, 8 Drawing Sheets

METHOD AND APPARATUS FOR AVOIDING ARRAY CLASS CREATION IN VIRTUAL MACHINES

BACKGROUND OF THE INVENTION

1. Field of the Invention

This invention relates computer programs and, more specifically, to minimizing internal structures at program runtime.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background Art

Computer systems comprise resources that are used to execute computer programs such as memory and processor (or processing) time. A computer program's code (or instruction set) is typically copied into the computer systems memory, or other storage, before it is executed thereby using processor time. In addition to the computer program's code, the computer system's storage may also be used to retain information about the state of the computer program during execution. This information adds additional overhead to the execution as it is necessary to allocate memory to store the information and to use other resources such as processor time to manage the information.

One example of program information that is stored during program execution are symbol, field and method tables. These tables are examples of internal structures that use space in memory during program execution. Further, processor time is used to maintain the information contained in the internal structures. It would be beneficial to be able to reduce the internal structures that are used during execution thereby reducing memory and processor time during program execution.

The problems associated with the use of internal structures during program execution can be better understood from a review of a virtual machine's processing environment and an overview of object-oriented programming.

Object-Oriented Programming

Object-oriented programming is a method of creating computer programs by combining certain fundamental building blocks, and creating relationships among and between the building blocks. The building blocks in object-oriented programming systems are called "objects." A software application can be written using an object-oriented programming language whereby the program's functionality is implemented using these objects.

An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

An object class provides a definition for an object which typically includes both variables and methods. An object class is used to create a particular object "instance." (The term "object" by itself is often used interchangeably to refer to a particular class or a particular instance.) An instance of an object class includes the variables and methods defined for the class. Multiple instances can be created from the same object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

Platform-Independent Programming Languages and Program Execution

Object-oriented software applications (e.g., applications written using the Java programming language) typically comprise one or more object classes and interfaces. Many programming languages can be used to write a program which is compiled into machine-dependent (or platform-dependent), executable code. However, in other languages such as the Java programming language, program code (e.g., classes) may be compiled into platform-independent bytecode class files. Each class contains code and data in a platform-independent format. A bytecode includes a code that identifies an instruction (an opcode) and none or more operands to be used in executing the instruction. The computer system acting as the execution vehicle contains a program such as a virtual machine, which is responsible for executing the platform-independent code (e.g., bytecodes generated from a program written using the Java programming language).

Platform-independent programs have an advantage of being usable on multiple platforms. There is no need to develop program code for multiple platforms. The same platform-independent program can be executed on multiple platforms using a virtual machine or other mechanism that is configured to translate the platform-independent code into platform-dependent code. Thus, an application developer can develop one version of an application's program code that can ultimately be executed on multiple platforms, for example.

Applications may be designed as standalone applications, or as "applets" which are identified by an applet tag in an HTML (Hypertext Markup Language) document, and loaded by a browser application. The class files associated with an application or applet may be stored on the local computing system, or on a server accessible over a network. Each class file is loaded into the virtual machine, as needed, by the "class loader."

The classes of an applet are loaded on demand from the network (stored on a server), or from a local file system, when first referenced during the applet's execution. The virtual machine locates and loads each class file, parses the class file format, allocates memory for the class's various components, and links the class with other already loaded classes. This process makes the code in the class readily executable by the virtual machine. Native code, e.g., in the form of a linked library, is loaded when a class file containing the associated native method is instantiated within the virtual machine.

Figure 1:
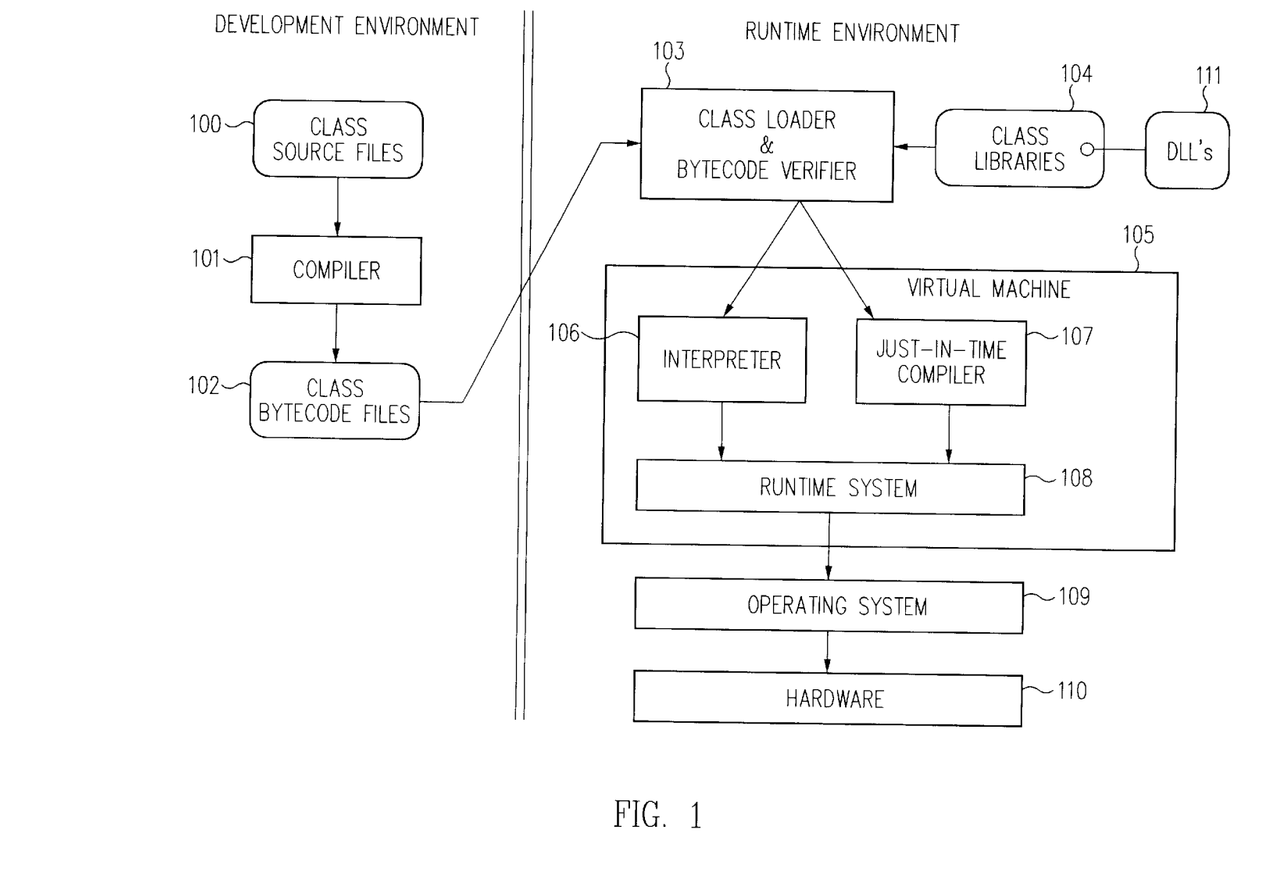
FIG. 1 is a block diagram of development and runtime environments.

FIG. 1 illustrates the development and runtime environments for a processing system. In the development environment, a software developer creates source files 100 written using a programming language such as the Java programming language, which contain the programmer readable class definitions, including data structures, method implementations and references to other classes. Class source files 100 are provided to compiler 101, which compiles class source files 100 into compiled ".class" (or class) files 102 that contain bytecodes executable by a virtual machine. Class files 102 are stored (e.g., in temporary or permanent storage) on a server, and are available for download over a network. Alternatively, class files 102 may be stored locally in a directory on the client platform.

The runtime environment contains a virtual machine (VM) 105 which is able to execute bytecode class files and execute native operating system ("O/S") calls to operating system 109 when necessary during execution. Virtual machine 105 provides a level of abstraction between the machine independence of the bytecode classes and the machine-dependent instruction set of the underlying computer hardware 110, as well as the platform-dependent calls of operating system 109.

Class loader and bytecode verifier ("class loader") 103 is responsible for loading bytecode class files 102 and supporting class libraries 104 into virtual machine 105 as needed. Class loader 103 also verifies the bytecodes of each class file to maintain proper execution and enforcement of security rules. Within the context of runtime system 108, either an interpreter 106 executes the bytecodes directly, or a "just-in-time" (JIT) compiler 107 translates the bytecodes into machine code, so that they can be executed by the processor (or processors) in hardware 110.

Linked library 111 can be, for example, a "shared object" library in the Solaris™ or UNIX environment that is written as a ".so" file, or linked library 111 may take the form of a dynamic linked (or loadable) library written as a ".dll" file in a Windows environment. Native code (e.g., in the form of linked library 111) is loaded when a class containing the associated native method is instantiated within the virtual machine, or by invoking a "load library" method, for example.

Interpreter 106 reads, interprets and executes a bytecode instruction before continuing on to the next instruction. JIT compiler 107 can translate multiple bytecode instructions into machine code that are then executed. Compiling the bytecodes prior to execution results in faster execution. If, for example, the same bytecode instruction is executed multiple times in a program's execution, it must be interpreted each time it is executed using interpreter 106. If JIT compiler 107 is used to compile the program, the bytecode instruction may be translated once regardless of the number of times it is executed in the program. Further, if the compilation (i.e., output of JIT compiler 107) is retained, there is no need to translate each instruction during program execution.

The runtime system 108 of virtual machine 105 supports a general stack architecture. The manner in which this general stack architecture is supported by the underlying hardware 110 is determined by the particular virtual machine implementation, and reflected in the way the bytecodes are interpreted or JIT-compiled.

Figure 2:
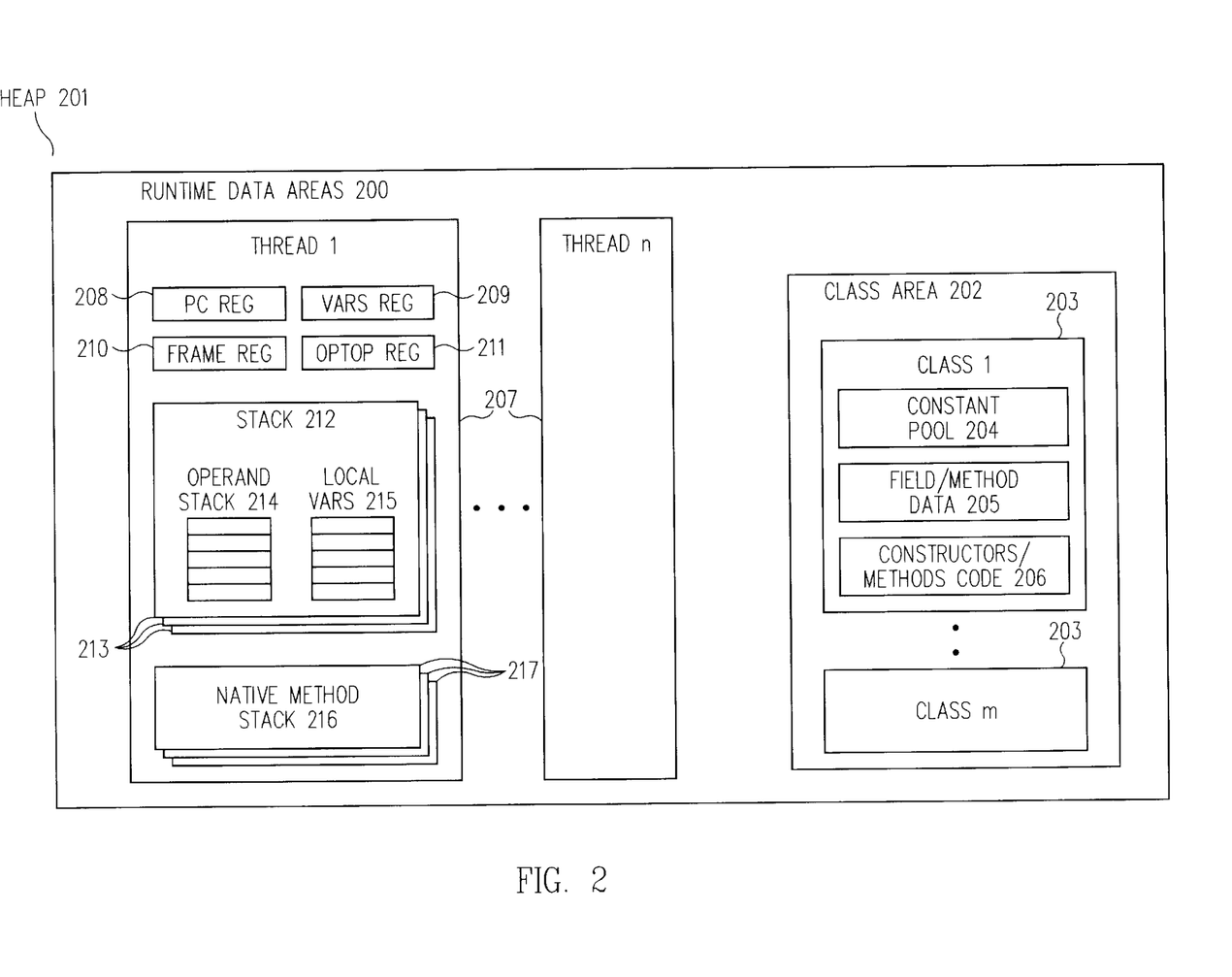
FIG. 2 is a block diagram of the runtime data areas of an embodiment of a virtual machine.

FIG. 2 illustrates runtime data areas which support the stack architecture within runtime system 108. In FIG. 2, runtime data areas 200 comprise one or more thread-based data areas 207. Each thread-based data area 207 comprises a program counter register (PC REG) 208, a local variables pointer register (VARS REG) 209, a frame register (FRAME REG) 210, an operand stack pointer register (OPTOP REG) 211, a stack 212 and, optionally, a native method stack 216. Stack 212 comprises one or more frames 213 which contain an operand stack 214 and local variables 215. Native method stack 216 comprises one or more native method frames 217.

A virtual machine can support many threads of execution at once. At any point, each thread is executing the code of a single method, the "current method" for that thread. If the "current method" is not a native method, program counter register 208 contains the address of the virtual machine instruction currently being executed. If the "current method" is a native method, the value of program counter register 208 is undefined. Frame register 210 points to the location of the current execution frame (containing the method parameters and local variables) in the execution stack 212 of thread 1.

Runtime data areas 200 are located in heap 201. Heap 201 is the runtime data area from which memory for all classes, class instances and arrays is allocated. Heap 201 includes class area 202 which contains one or more class-based data areas 203 for storing information extracted from each loaded class file. For example, class-based data area 203 may comprise class structures such as constant pool 204, field and method data 205, and code for methods and constructors 206.

Constant pool 204, field and method data 205 and code for methods and constructors 206 are examples of internal structures that are stored in memory for a class when it is loaded into the runtime of the virtual machine. Class area 202 is created when virtual machine 105 initializes. When a new class is loaded, memory is allocated for the internal structures associated with the class (e.g., constant pool 204, field and method data 205 and code for methods and constructors 206).

Typically, only one internal class structure is created for an object class. However, in some circumstances, such as instantiating an array, more than one internal class structure is created. An array is a structure that contains none or more elements or components of the same type (e.g., integer, floating point, short, long, etc.). The component type is often referred to as the element type of the array. Thus, for example, where the array is comprised of components of type integer, the array is said to be an integer array. The element type of the array can also be an object (class) such as a BankAccount object (that includes properties and behavior for a bank account) or a Thread object (that includes properties and behavior for a thread). In this case, an array is associated with two object classes: an array object class and an element type class.

In object-oriented programming languages, all objects must be instances of some class. For instance, all bank account objects are typically instances of class "Account". The same is true also of arrays, i.e., they must be instances of classes too. Since arrays do not usually have any corresponding source-level class definition, an internal array class is created automatically by the system. The array class stores the information that is shared between all the array instances of the same type, including the element type information.

Figure 3A:
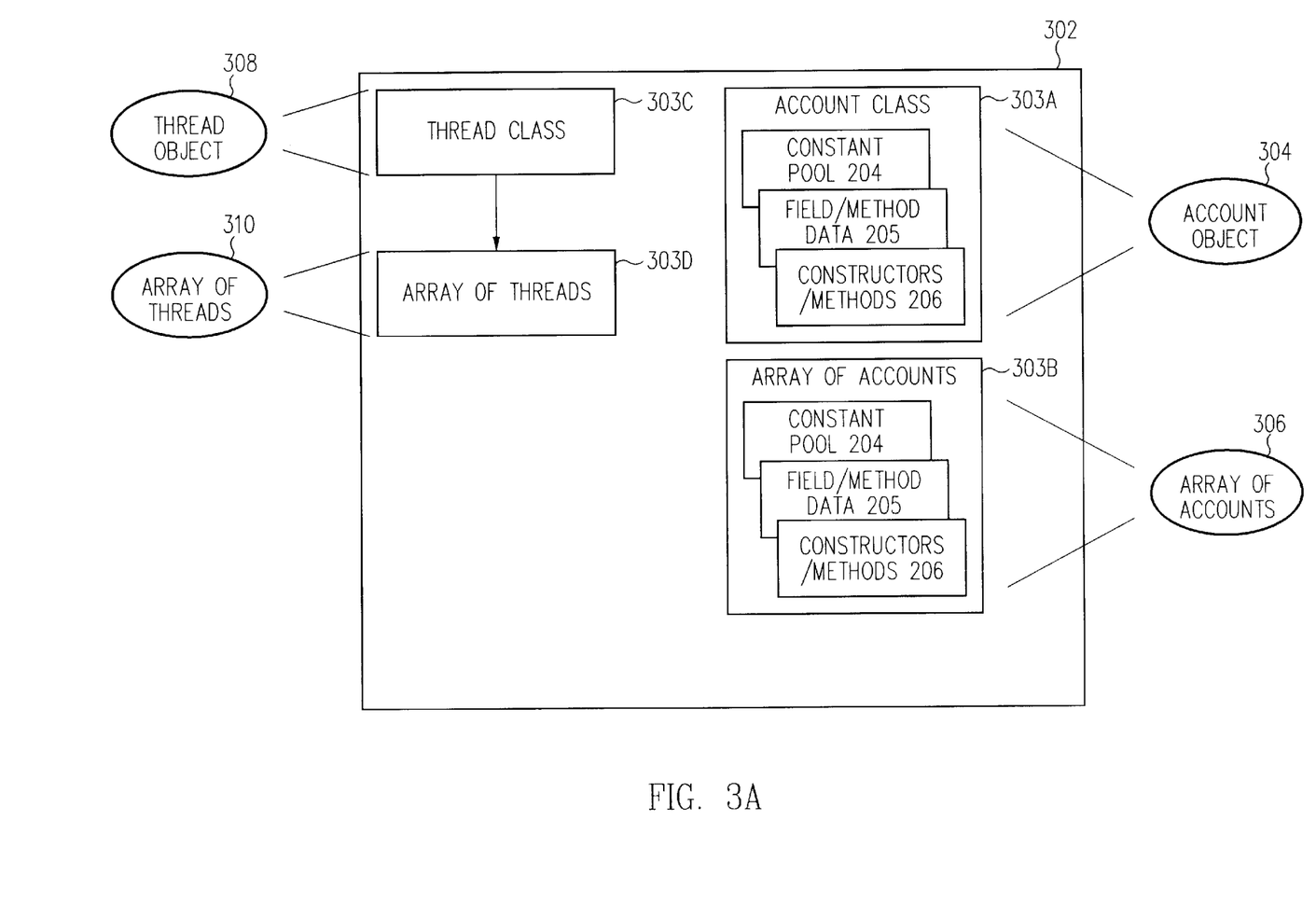
FIG. 3A provides an illustration of internal structures created for two different types of arrays.

In general, each array instance in an object-oriented program is associated with two class structures: the internal array class storing the shared information between array instances, and the element type class defining the type of the elements that can be stored in the array. Since the element type is the same for all the arrays of the same type, the element type information is commonly stored in the array class. FIG. 3A provides an illustration of internal structures created for two different types of arrays.

For example, an array of "Accounts" results in the creation of internal class structure 303B for the array of Accounts object 306 and the creation of internal class structure 303A for the. "Account" element type object class 304 in memory area 302. Similarly, an array of "Threads" has two internal structures in memory area 302 (i.e., internal class structure 303C for the "Thread" element type object class and internal class structure 303D for the array of Threads).

The creation of the necessary internal structures for arrays usually takes place when an array is declared in program code. At that point, the element class will be loaded (if it has not already been loaded), the internal array class will be created, and an array instance referring to the array class is allocated.

It is important to notice that the role of an array object class is limited to such tasks as ensuring that there is no type mismatch (e.g., assigning data from an array of one type to an array of another type). In most programming languages, there is no ability to add new methods to the array object class. That is, the array object class cannot be modified to include functionality in addition to its type checking function. For this reason, the only really relevant information in array classes is the element type information. Otherwise, array classes are rather redundant structures.

Figure 3B:
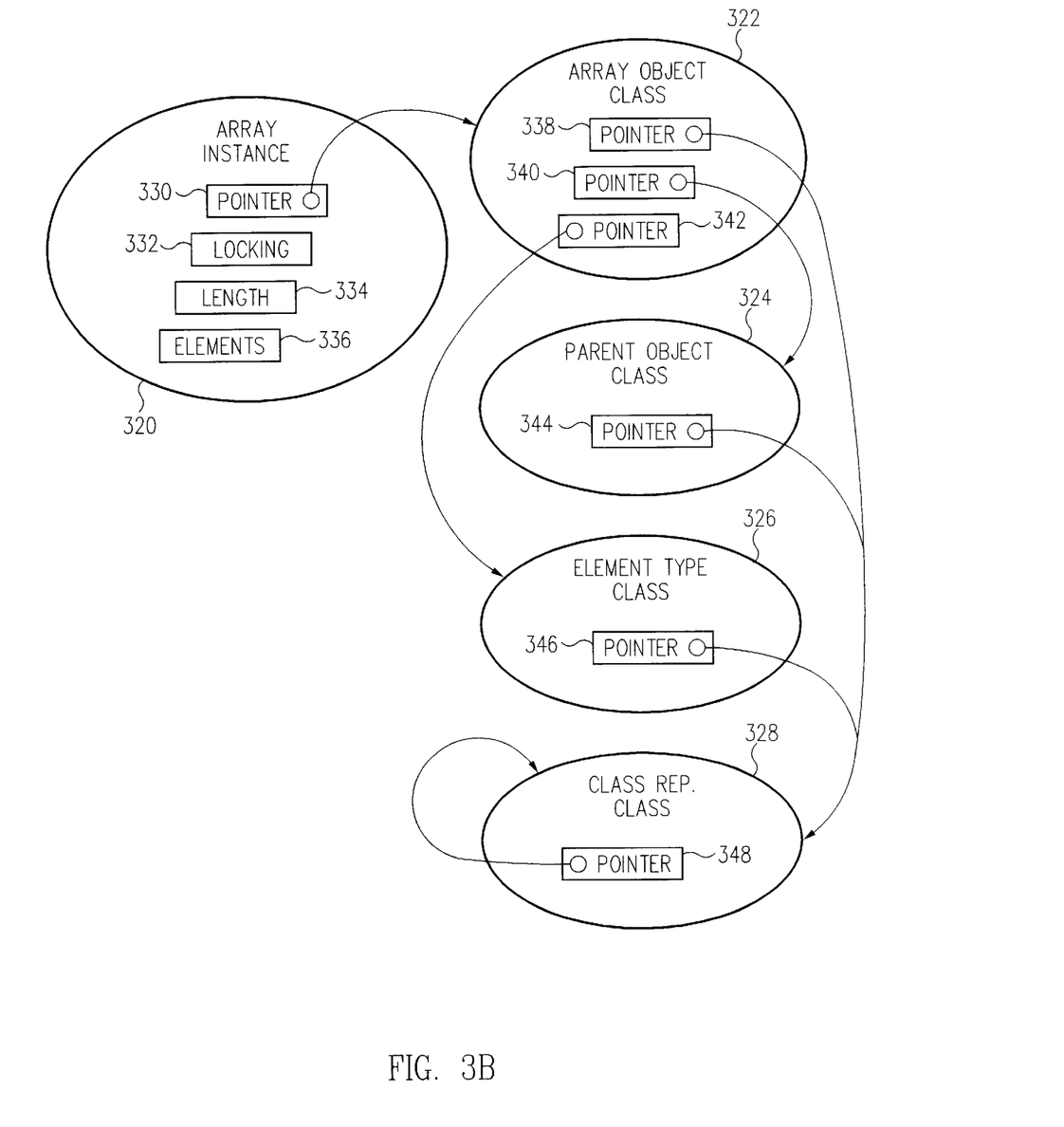
FIG. 3B provides a more detailed illustration of the runtime state of a Java virtual machine as a result of array instantiation.

FIG. 3B provides a more detailed illustration of the runtime state of a virtual machine as a result of an array instantiation. Memory is allocated to store the internal structures for array object class 322, parent object class 324 ( e.g., "java.lang.Object" in the Java programming language), element type class 326 and class representation class 328 (e.g., "java.lang.Class" in the Java programming language). Array instance 320 is created as an instance of array object class 322 which is created by VM 105. Array instance 320 includes a field, class pointer 330, that points to array object class 322. Array instance 320 may include a locking field that is used to synchronize write operations, for example. A length field 334 identifies the number of elements in array instance 320. Elements 336 represents the elements of the array. Elements 336 can contain pointers to instances of element type class 326 that contain the actual values of the array.

Array object class 322 includes a pointer 342 that identifies the element type for array instances that are instantiated from array object class 322. That is, pointer 342 identifies the element type of array instance 320. Note that in some implementations of the VM the reference to the element type class is not necessarily a physical pointer; rather, the name of the array class can be used to indirectly indicate the element type. This is because the name of the array class is always the same as the name of the element type, except that the name has been augmented with the prefix "[" (see Lindholm, T. & Yellin, F., *The Java Virtual Machine Specification*, Addison-Wesley 1996, p. 146). In addition, array object class 322 may contain two other pointers 338 and 340. Pointer 338 refers to the parent class 344 (e.g., the "java.lang.Object") that is the common superclass of all array classes in the Java programming language. Pointer 340 points to the class representation class 328 (e.g., "java.lang.Class"). All classes in the Java programming language, including the array classes, are instances of the class representation class. For example, element type class 326 and class representation class 328 are instances of, and contain pointers to (i.e., pointers 346 and 348), class representation class 328.

As explained earlier, the main role of the array classes in the Java programming language and many other object-oriented programming systems is to serve as placeholders for shared element type information. Unlike regular classes, array classes do not contain any method or variable definitions, and therefore their constant pools, method tables and field tables (see FIG. 3A) are typically empty. In general, except for their role in type checking, array classes are rather redundant. They add overhead to programs due to memory used and the time needed to allocate and deallocate memory, for example. Some application programs use a number of arrays with different element types, or multidimensional arrays (i.e., arrays of arrays), and in such situations a separate array class has to be created for each type of array.

Memory usage can be very critical if only a limited amount of memory is available. For example, an embedded system such as a smart card or a personal organizer device has a limited amount of memory. It would be beneficial to reduce the number of internal structures needed, thereby reducing memory and power consumption.

SUMMARY OF THE INVENTION

Embodiments of the invention comprise a method and apparatus for avoiding array object class creation in, for example, platform-independent virtual machines for object-oriented programming languages. Embodiments of the invention reduce the internal structures created for arrays at runtime, thereby reducing memory consumption.

Unlike in a traditional implementation, where a separate array class is created for each array of different type, in an embodiment of the invention the type information is stored in array instances instead. Array classes are not created at all. Rather, the root class of the class hierarchy (e.g., "java.lang.Object") is used as the class of each array instance. When an array instance is instantiated, a reference to the root class is created in the class field of the array instance and the type information is stored in the instance itself.

The type information contained in the array instance can be used to identify the type of the array. In an embodiment that uses an integer type value, the value either maps to a known type or an unknown type. Where an unknown type is indicated by the value that is retrieved from the array instance, a method is provided for accessing an element of the array to determine the type of the array instance.

In an embodiment that uses a reference type field, the type field can either contain an integer type value for known types, or a reference to an element type object where the type is an unknown type. A method is provided for accessing the type field to determine whether the type information is an integer type of an object reference.

DETAILED DESCRIPTION OF THE INVENTION

A method and apparatus for avoiding array object class creation is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention. For example, embodiments of the invention are described in the context of the Java programming language developed by Sun Microsystems, Inc. of Palo Alto, Calif. However, the actual implementation is applicable to other object-oriented programming languages and virtual machines as well.

Embodiments of the invention reduce the internal structures in a virtual machine, thereby reducing the amount of memory and processing power required. In embodiments of the invention, an array is treated as an object-oriented object. As is typical in object-oriented programming languages, various different types of arrays can be created, and multiple instances of each array type can be instantiated.

Unlike in a traditional VM, where the virtual machine creates an internal array class for every different type of array, in embodiments of the invention internal array classes are not created at all. For this reason, the class pointer of each array instance will not refer to the internal array class. Rather, the class pointer of each array will contain reference to a root class (e.g., the "java.lang.Object"), the common parent class of all the arrays (and other object classes) in the Java programming language. The necessary element type information is stored in each array instance. This is different from a traditional VM implementation, where element type information is stored in the array class.

The element type information contained in the array instance can be used to identify the type of the array in order to perform type checking. Typically, a virtual machine such as the Java virtual machine includes special instructions to perform type checking. For example, the Java programming language includes "instanceof" and "checkcast" bytecodes that use type information to perform type checking of data.

In one embodiment of the invention, the type information stored in array instances is represented as a numeric integer value that maps to a type. The type can be, for example, one of the primitive data types such as character, floating point, double, byte, short, integer, long or boolean. An additional number is reserved to represent non-primitive object types defined by the application developer.

In an alterative embodiment, either a numeric value or an object reference is used to identify the element type of an array class instance. For example, a numeric value can be used in the type field of the array instance to specify an array that contains elements of a primitive type. An object reference (pointing to the element type class) can be used with an array containing elements of a non-primitive type.

Figure 4:
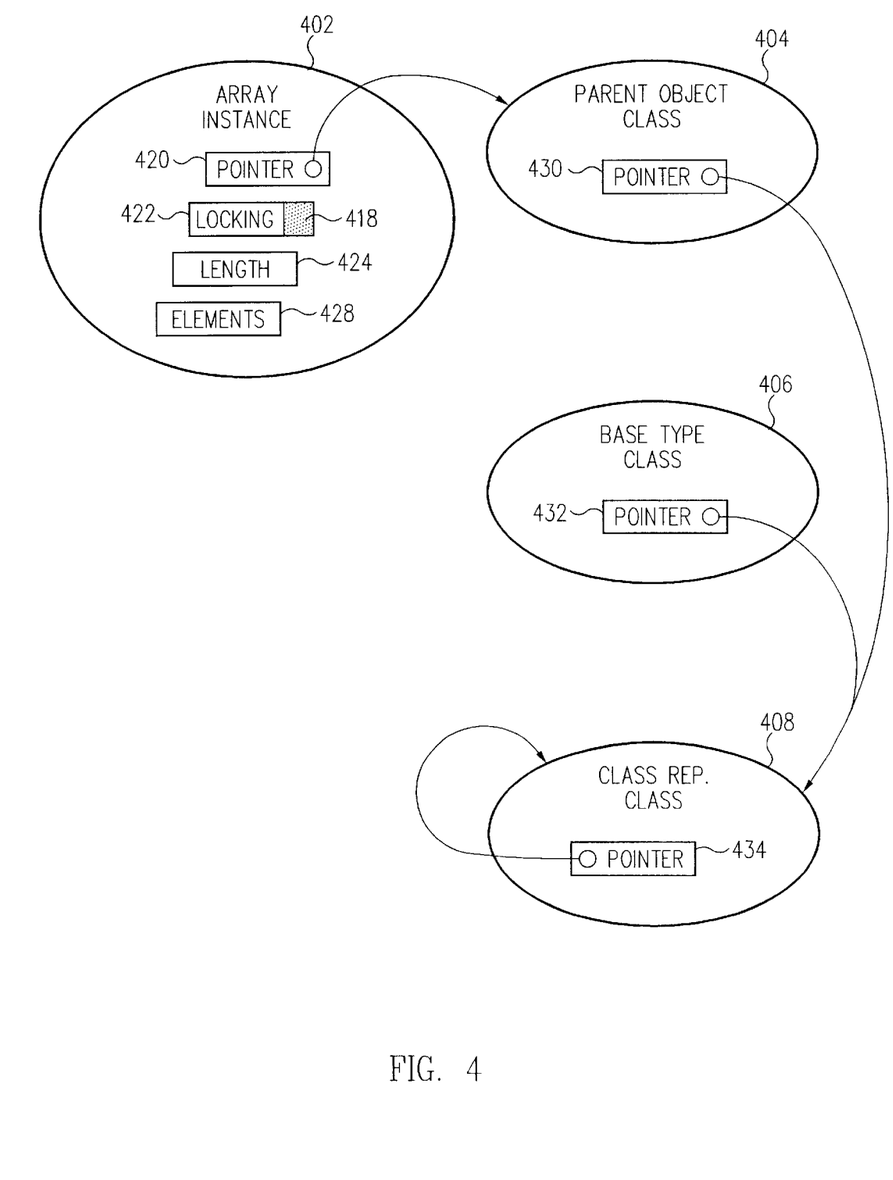
FIG. 4 illustrates the use of an integer type value associated with an array instance according to an embodiment of the invention.

FIG. 4 illustrates the use of an integer type value associated with an array instance according to an embodiment of the invention. Array instance 402 is an instance of an array object class that includes a class field 420 that points to parent object class 404 (e.g., the "java.lang.Object" object class). Further, array instance 402 includes type field 418 which contains an integer type value that identifies a datatype. In one embodiment of the invention, type field 418 is a 4-bit field. However, it should be apparent that type field 418 can be other sizes. For example, type field 418 can be a number, n, where $2^n$ yields a result that is greater than or equal to the number of primitive types, and other types, that are to be specified in type field 418. Where "n" is four, type field 418 can store a value from one to sixteen, for example.

An array instance typically has a locking field 422 for use in synchronizing a write operation, etc. Type field 422 can be segregated to include both the locking information and type field 418. That is, 4 bits of the locking field 422 can be allocated to a type identifier, or value. While a portion of locking field 422 is used to store a type value, it should be apparent that another field may be used.

The following "Value Table" provides an example of integer type values according to an embodiment of the invention:

| Value | Description |
|---|---|
| 1 | Object Reference |
| 4 | Boolean Array |
| 5 | Character Array |
| 6 | Float Array |
| 7 | Double Array |
| 8 | Byte Array |
| 9 | Short Array |
| 10 | Integer Array |
| 11 | Long Array |

To illustrate, a value of "5" in type field 418 of array instance 402 indicates that it is a character array (i.e., an array of character elements, or compounds). If type field 418 of array instance 402 contains a value of "6," array instance 402 contains floating point elements. A value of "1" indicates that the array contains elements that are of a non-primitive datatype. That is, the value of "1" denotes a general (non-primitive) object array.

In an alternate embodiment of the invention, the type field is a field that contains a reference to an element type class. According to this embodiment, the type field is a multi-bit field. As a 32-bit, word-length field, for example, the type field can store a reference (e.g., a full class pointer) to array instance 402's element type object class (e.g., element type class 406). In one embodiment of the invention, if array instance 402 is an array of primitive type elements, the type field contains an integer type value (e.g., a value from the Value Table above) to identify array instance 402's type as one of the primitive types.

An object reference contained in type field 444 can be used to identify a non-primitive type where array instance 402 is a non-primitive datatype. For example, if array instance 402 is an array of threads, type field 444 can contain a reference to a thread element type class (e.g., the "java.lang.Thread" object class). It should be apparent that any form of reference or pointer can be used to identify an element type in type field 444. Further, the size of type field 444 can be varied to accommodate the specific pointer or reference that is used to identify the element type object.

In the Java programming language, array instance 402 of FIG. 4 can be declared such as in the following statement:

Thread myThreads [ ];

Previously, the above declaration resulted in a Java virtual machine (e.g., VM 105) creating an internal array class (e.g., array object class 322 of FIG. 3B) in addition to loading the other necessary classes (e.g., the element type class). The array class (e.g., array object class 322) was used to identify the type of the array which could be used in operations that use type information (e.g., instanceof and checkcast operations). According to one or more embodiments of the invention, array type information is stored in an array instance (e.g., array instance 402 of FIG. 4. There is no need to create an array class.

Type Checking in the Presence of the Embodiments of the Invention

Various mechanisms can use the type information (e.g., type field 418 of FIG. 4) stored in the array instance. For example, in the Java programming language, an instanceof operator can be used to test the class of an object. The following is an example of a use of the instanceof operator involving an array, myIntegers:

result=myIntegers instanceof Integer

In this example, result contains the result of the instanceof operation. The type of myIntegers is compared to the type of Integer to determine whether the myIntegers array is of type Integer. If they are the same, result is equal to true, and is false otherwise.

Similarly, type information may be used to perform type checking. Type checking may be used to determine, whether one array can be set to another array's element values, for example. The checkcast bytecode is the Java programming language is an example of a type checking operation.

An array's type can be determined using type fields 418 and 444. In the instanceof example, if type field 418 contains a value of "10", result is equal to true. Similarly, if type field 444 contains a pointer to an Integer element type class, result is set to true.

Figure 5:
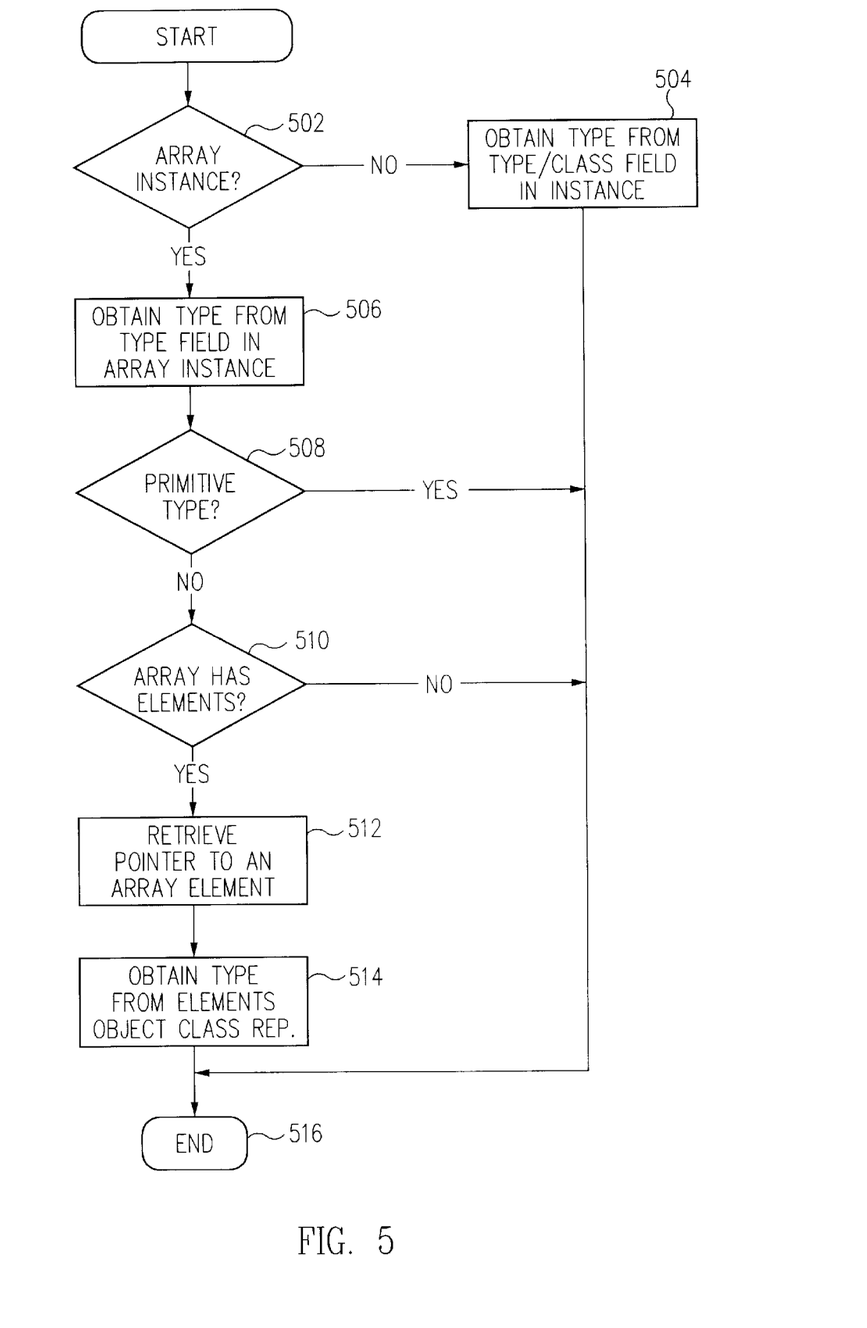
FIG. 5 provides an example of a type retrieval process flow according to an embodiment of the invention.

Thus, element type information can be retrieved from array instances 402 and 442 to determine the type of the array. FIG. 5 provides an example of a type retrieval process flow according to an embodiment of the invention.

At step 502, a determination is made whether the instance is an array instance. If not (e.g., an instance of a non-array object class), processing continues at step 504 to obtain the type of the instance from a type/class field in the instance. For example, parent object class 404 and class representation class 408 can be used to retrieve an object's type. Parent object class 404 and class representation class 408 are, for example, the "java.lang.Object" and "java.lang.Class" object classes in the "java.lang" package available from Sun Microsystems, Inc. The "java.lang.Object" class includes a getclass ( ) method that returns a reference to the "java.lang.Object" class that represents the instance's class. A getName ( ) method of the "java.lang.Class" class returns the fully qualified name of the class represented by the "java.lang.Object" class.

If it is determined, at step 502, that the instance is an array instance, processing continues at, step 506 to retrieve the type value from the array instance's type field. For example, the value stored in type field 418 is retrieved at step 506. At step 508 a determination is made whether the type value retrieved designates a primitive type. If so, type retrieval processing ends. If not, processing continues at step 510.

As indicated in the Value Table above, a type value equal to "1" designates that the array is a non-primitive type (i.e., contains object references rather than primitive values). A value of "1" does not identify the specific non-primitive type. If the array contains elements, it may be possible to retrieve the type of an element of the array to determine the type of the array. Therefore, at step 510, a determination is made whether the array has elements. This can be determined, for example, by accessing elements 428 of array instance 442 which contains pointers to the object instances that contain the actual values of the array elements. At step 514, an array element's type can be determined from its object class representation (e.g., class representation class 408) of the element type class 406 instance as discussed above.

The process flow of FIG. 5 does not yield a type where type field 418 does not identify a specific type and array instance 402 has no elements. In the Value Table above, for example, non-primitive types are not individually delineated. It is possible, however, that Value Table can be expanded to include non-primitive types as well. Alternatively, it is possible to use type field 444 to accommodate both primitive and non-primitive types.

The type field can contain a reference to a non-primitive element type object class, for example. Where the array instance is an array of Threads, for example, the type field can contain a reference to the Thread object class (e.g., the "java.lang.Thread" object class). Where the array instance is an array of primitive types, the type field can contain a type value (e.g., as in the Value Table), or a reference to the primitive element type object class.

Figure 6:
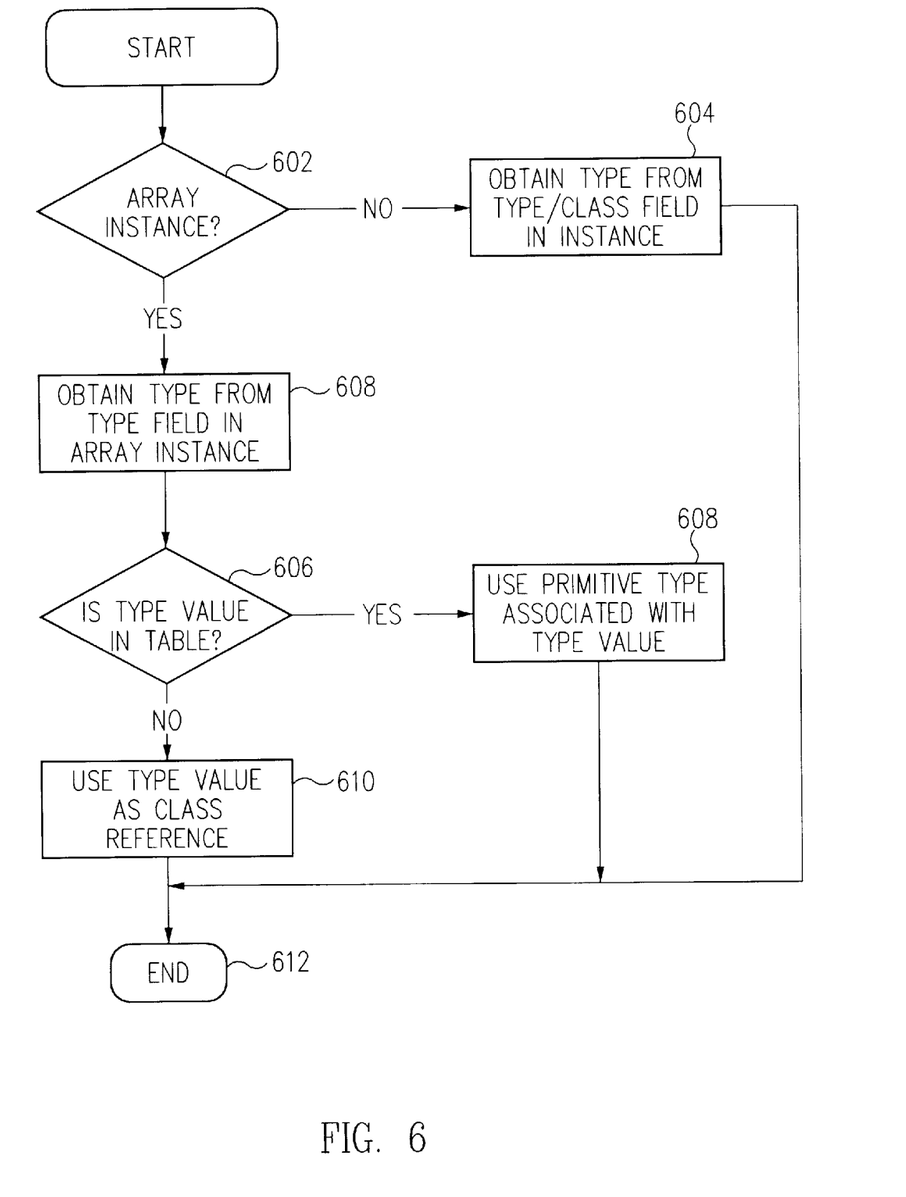
FIG. 6 provides an example of a type retrieval process flow using object references and type values according to an embodiment of the invention.

FIG. 6 provides an example of a type retrieval process flow using object references and type values according to an embodiment of the invention. At step 602, a determination is made whether the instance is an array instance. If not (i.e., the instance is a non-array object class instance), processing continues at step 604 to obtain the type of the instance from a type/class field in the instance such as is discussed above with reference to step 504.

If it is determined at step 602 that the instance is an array instance, processing continues at step 606 to obtain the contents of type field 444 from array instance 442. At step 606, a determination is made whether the type value is one of the values in the Value Table. If so, processing continues at step 608 to use the value to identify array instance 442 as being the type associated with the type value retrieved from field 444.

If the value retrieved from type field 444 is not one of the those contained in the Value Table, processing continues at step 610 to use the type value as a class reference (e.g., a reference to element type class 406). The getClass ( ) and getName ( ) methods can be used as discussed above to determine a type for element type class 406 thereby identifying the type of array instance 442.

Embodiment of Computer Execution Environment (Hardware)

Figure 7:
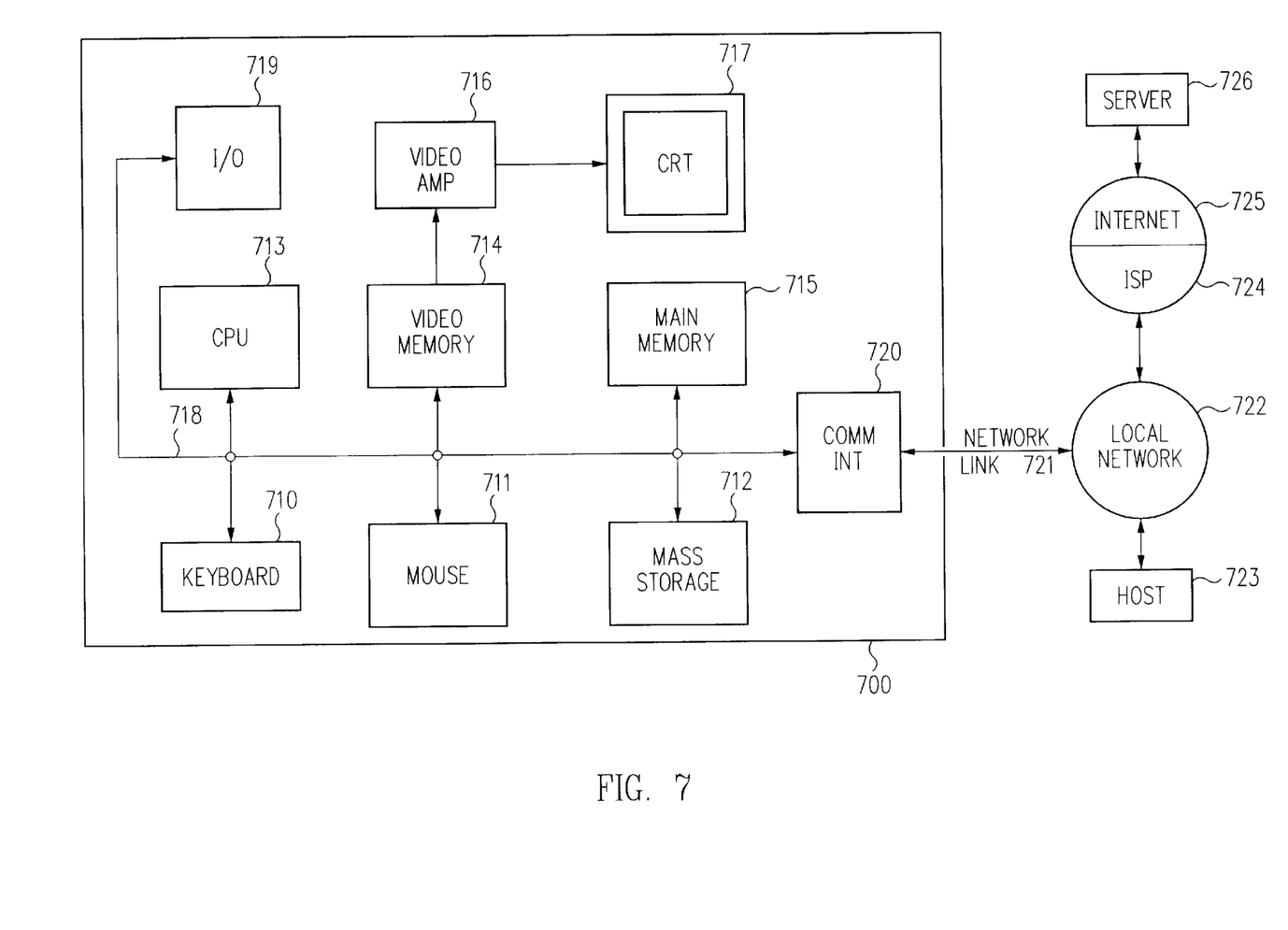
FIG. 7 is a block diagram of one embodiment of a computer system capable of providing a suitable execution environment for an embodiment of the invention.

An embodiment of the invention can be implemented as computer software in the form of computer readable code executed on a general purpose computer such as computer 700 illustrated in FIG. 7, or in the form of bytecode class files executable within a runtime environment running on such a computer, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to processor 713. Other suitable input devices may be used in addition to, or in place of, the mouse 711 and keyboard 710. I/O (input/output) unit 719 coupled to system bus 718 represents such I/O elements as a printer, A/V (audio/video) I/O, etc.

Computer 700 includes a video memory 714, main memory 715 and mass storage 712, all coupled to system bus 718 along with keyboard 710, mouse 711 and processor 713. The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 64-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc., a microprocessor manufactured by Motorola such as the 680X0 processor, or a microprocessor manufactured by Intel such as the 80X86 or Pentium processor. However, any other suitable microprocessor or microcomputer may be utilized.

Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images. Alternatively, the video memory could be used to drive a flat panel or liquid crystal display (LCD), or any other suitable data presentation device.

Computer 700 may also include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Communication interface 720 could also be a cable modem or wireless interface. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by an Internet Service Provider (ISP) 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Computer 700 can send messages and receive data, including program code, through the network(s), network link 721, and communication interface 720. In the Internet example, remote server computer 726 might transmit a requested code for an application program through Internet 725, ISP 724, local network 722 and communication interface 720.

The received code may be executed by processor 713 as it is received, and/or stored in mass storage 712, or other non-volatile storage for later execution. In this manner, computer 700 may obtain application code in the form of a carrier wave. In accordance with an embodiment of the invention, examples of such downloaded applications include a method and apparatus for avoiding array object class creation described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Thus, a method and apparatus for avoiding array object class creation has been described in conjunction with one or more specific embodiments. The invention is defined by the claims and their full scope of equivalents.

What is claimed is:

1. A computer system comprising:

a processor;

an object instance creator coupled to said processor;

an array instance created by said object instance creator using a definition of an array object class, said array instance containing a pointer to a parent object class, an array type of said array instance being stored in a type field of said array instance.

2. The computer system of claim 1 wherein said array type is an integer value identifying said array instance as one from a plurality of primitive datatypes and non-primitive datatypes.

3. The computer system of claim 1 wherein said array type comprises a reference to an element type object class, said element type object class having said type information.

4. The computer system of claim 3 wherein said object creator is a virtual machine.

5. The computer system of claim 4 wherein said virtual machine is a virtual machine written in the Java programming language.

6. A computer program product comprising:

a computer usable medium having computer readable program code embodied therein configured to use arrays in an object-oriented programming environment comprising:

computer readable program code configured to cause a computer to create an instance of an array object class, said instance containing a reference to a parent object class of said array object class;

computer readable program code configured to cause a computer to store array type information of said instance in a field of said instance.

7. The computer program product of claim 6 wherein said element type information identifies said instance as one from a plurality of primitive datatypes and non-primitive datatypes.

8. The computer program product of claim 6 wherein said element type information comprises a reference to an element type class, said element type class having said element type information of said instance.

9. The computer program product of claim 6 further comprising:

computer readable program code configured to cause a computer to determine an array type using said element type information of said instance.

10. The computer program product of claim 9 wherein said computer readable program code configured to cause a computer to determine an array type further comprises:

computer readable program code configured to cause a computer to determine whether said element type information identifies a primitive datatype;

computer readable program code configured to cause a computer to use said primitive datatype as said array type when said element type information identifies a primitive datatype;

computer readable program code configured to cause a computer to identify said array type as a non-primitive datatype when said element type information does not identify a primitive datatype.

11. The computer program product of claim 10 wherein said element type information contains a reference to an element type class, said computer readable program code configured to cause a computer to identify said array type as a non-primitive datatype further comprises:

computer readable program code configured to cause a computer to identify said array type as a type of said element type class.

12. The computer program product of claim 10 wherein said computer readable program code configured to cause a computer to identify said array type as a non-primitive datatype further comprises:

computer readable program code configured to cause a computer to determine said type of said array using an element of said array.

13. The computer program product of claim 12 wherein said computer readable program code configured to cause a computer to determine said type of said array using an element of said array further comprises:

computer readable program code configured to cause a computer to determine whether said element exists in said array;

computer readable program code configured to cause a computer to retrieve from an object instance of said element an element type;

computer readable program code configured to cause a computer to identify said array type as being said element type.

* * * * *